Sept. 18, 1928.     1,684,905
W. B. BASTIAN
QUICK THROW VALVE
Filed April 27, 1927
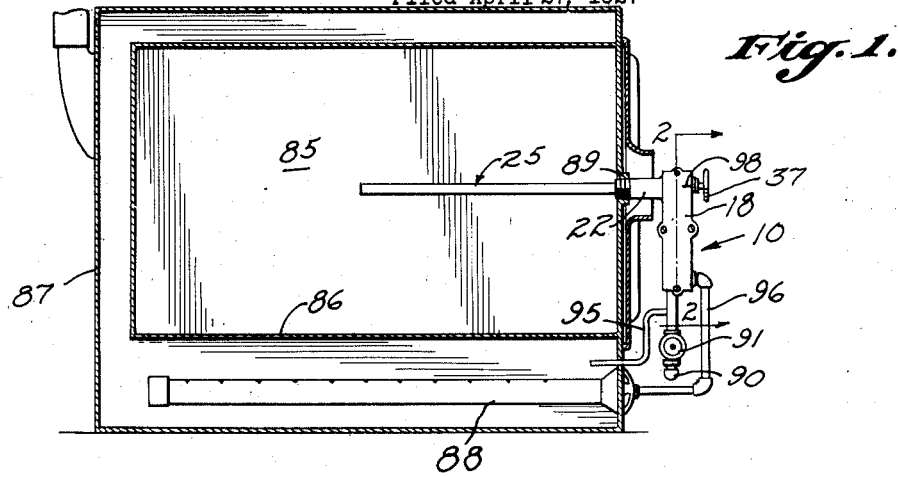
*Fig. 1.*
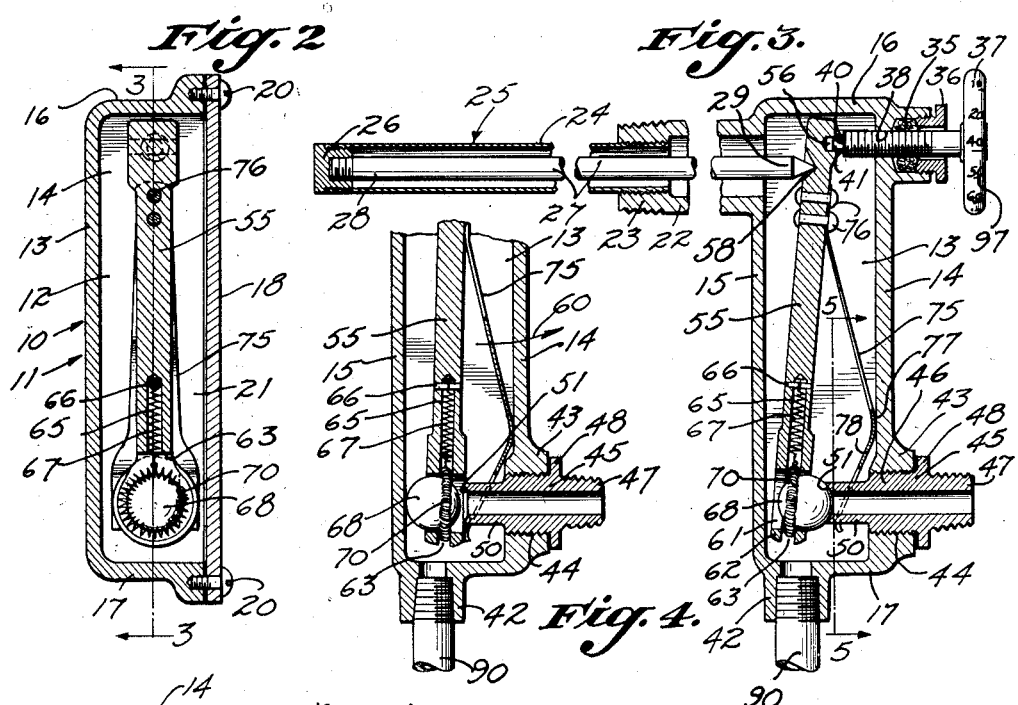
*Fig. 2.* *Fig. 3.* *Fig. 4.*
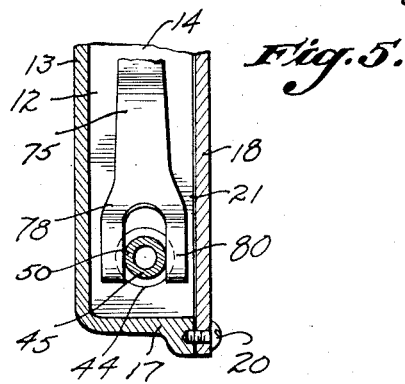
*Fig. 5.*
INVENTOR:
WILLIAM B. BASTIAN
BY
ATTORNEY.

Patented Sept. 18, 1928.

1,684,905

UNITED STATES PATENT OFFICE.

WILLIAM B. BASTIAN, OF LOS ANGELES, CALIFORNIA.

QUICK-THROW VALVE.

Application filed April 27, 1927. Serial No. 187,045.

My invention relates to quick-throw valves and more particularly to such valves which are thermostatically operated.

In my U. S. Patent No. 1,621,866, issued March 22, 1927, I show a quick-throw valve which operates on the same general principle as the valve of this invention.

It is a broad object of my invention to provide an improved quick-throw valve.

In the valve shown in said patent, a valve ball is moved on a vertical axis to and from a valve seat by a garter spring stretched around the ball. A lever is forked at one end to surround the ball and straddle the garter spring This lever is adjustably fulcrumed at its opposite end, and a thermostatic element bears against the lever near the fulcrum to swing the lever and actuate the valve ball. The thermostatic element preferable for this purpose is of considerable length and, unless the mechanism is complicated with a motion direction changing device, necessarily extends parallel to the axis on which the valve ball moves.

In the valve shown in said patent, the valve ball is not adapted to operate properly on any but a vertical axis. This requires that the thermostat also be disposed vertically and precludes the use of such valve where it is essential that the thermostat be placed horizontally.

It is therefore another object of my invention to provide a quick-throw valve in which a valve ball is adapted to operate on a horizontal axis.

In the valve above described, it is necessary that the lever be guided so as not to bear against the valve ball and prevent its proper functioning. Means previously provided for this purpose has proven unsatisfactory due to its making a sliding contact with the lever so as to occasionally bind and prevent the operation of the lever.

A further object of my invention is to provide a quick-throw valve having a lever guide which will not interfere with the proper function of said lever.

In many uses of a quick-throw valve with a thermostat the thermostat is set to operate the valve between a range of temperatures well above the temperature of the atmosphere. The thermostat usually applies a pressure to the valve as the temperature decreases. Thus when the apparatus in which the thermostat is used is allowed to cool down to atmospheric temperature, the thermostat tends to place an excessive pressure upon the valve mechanism.

It is a further object of my invention to provide a quick-throw valve which is adapted to yieldably resist the excessive pressure applied by the thermostat so that the valve mechanism will be protected from said pressure.

Further objects and advantages will be made manifest hereinafter.

In the drawings which illustrate a preferred embodiment of my invention,

Fig. 1 is a diagrammatic view illustrating the utility of the quick-throw valve of my invention.

Fig. 2 is a vertical sectional view taken on the line 2—2 of Fig. 1.

Fig. 3 is a vertical sectional view taken on the line 3—3 of Fig. 2.

Fig. 4 is a fragmentary view similar to a portion of Fig. 3 for the illustration of the operation of the invention.

Fig. 5 is a vertical sectional view taken on the line 5—5 of Fig. 3.

Referring specifically to the drawings, the numeral 10 indicates the quick-throw valve of my invention. This valve has a housing shell or body 11 which includes a box 12 having a back wall 13, side walls 14 and 15 and top and bottom walls 16 and 17, respectively. The side of the box 12 opposite the back wall 13 is open and is adapted to be closed by a cover 18 which is held against the edges of the side walls 14 and 15 and top and bottom walls 16 and 17 by machine screws 20 so as to form a tight chamber 21 in the shell 11. A short tubular neck 22 extends horizontally from the upper portion of the wall 15, this neck terminating in the internally and externally threaded nipple 23.

Threadedly received into the internal threads of the nipple 23 is a copper tube 24 of a thermostatic element 25. The copper tube 24 extends a considerable distance outward from the nipple 23 and is provided with a plug 26 at its outer end. A steel rod 27 is disposed in the copper tube 24, one end 28 of the rod being secured to the plug 26 and the other end 29 being pointed and extending a slight distance into the housing chamber 12.

A stuffing box 35 is provided in the wall 14, the axis of the stuffing box 35 being disposed a slight distance above that of the neck 22. A threaded shaft 36 having a handwheel 37 is threadedly received in a threaded opening 38 in the wall 14 about which the stuffing box 35 is formed. The shaft 36 has a polished radial end face 40, from the center of which projects a centering pin 41.

An internally threaded nipple 42 is provided in the wall 17 so as to communicate with the chamber 21. The wall 14 has a reinforced portion 43 at its lower end which is provided with a threaded opening 44. A valve seat nipple 45 has threaded end portions 46 and 47, the portion 46 being threadedly received in the hole 44. An annular shoulder 48 is formed between the threaded portions 46 and 47 of the nipple 45, the shoulder 48 bearing against the thickened wall portion 43 so as to form a tight seal therewith. A short tube 50 extends into the chamber 21 from the nipple 45, the tube 50 having a valve seat 51 formed a its inner end. The axis of the nipple 45 is preferably disposed substantially parallel with the axis of the thermostat 25, as will become apparent later.

A lever 55 extends substantially through the length of the chamber 21, the upper end of the lever 55 being provided with a pocket 56 which fits over the pin 41 of the shaft 36, a knife edge provided on the lever 55 then coming into contact with the radial end surface 40 of the shaft 36. When the lever 55 is thus disposed, the pointed end 29 of the thermostat rod 27 projects into a depression 58 formed in an opposite face of the lever 55 from that in which the recess 56 is formed. The face 40 of the shaft 36 forms a fulcrum for the lever 55 when the lever is swung in the direction of the arrow 60 about its fulcrum. An opening 61 provided in a head 62 formed at the opposite end of the lever 55 is adapted to extend around the tube 50. The head 62 has a slot 63 which bifurcates the head and is disposed at right angles to the axis of the opening 61. A hole or cavity 65 is bored longitudinally from the slot 63 into the shank of the lever 55. A pin 66 projects through the lever 55 at the upper end of the hole 65, engaging the upper end of a small tension spring 67 so as to retain this spring in the hole 65. A valve member in the form of a ball 68 is of such diameter as to permit it to freely pass through the opening 61 and, as the lever 55 swings about its fulcrum, the ball 68 is retained in a position opposite the valve seat 51 by the opening 61. A garter spring 70 is of such length as to constrict about the ball 68 and tends to force this toward or away from the valve seat 51, depending upon which side of the center of the ball 68 the garter spring 70 is disposed.

The lower end of the tension spring 67 is connected to the garter spring 70 so as to exert an upward pull upon the garter spring 70 and thus supports the weight of the ball 68 while this is being urged in one direction or the other by the garter spring 70.

A leaf spring 75 has an end thereof rigidly secured by rivets 76 to the upper end of the lever 55. The spring 75 extends downward and outward from the lever 55 toward the wall 14 so that a bend 77 in the spring 75 slidingly engages the inner surface of the wall 14. A foot 78 of increased width is formed upon the lower end of the spring 75 below the bend 77, the foot 78 being forked so that opposite legs 80 thereof extend beyond and engage opposite sides of the tube 50 so as to maintain the motion of the lever 55 about its fulcrum in the plane of the axis of the valve seat nipple 45. The extreme ends of the legs 80 are curved away from the lever 55, as shown.

In Fig. 1, the valve 10 of my invention is shown incorporated with an oven 85 for the purpose of controlling the temperature of the oven. The oven 85 has an oven box 86 maintained in an outer shell 87 and a gas burner 88 provided beneath the box 86 within the shell 87. The nipple 23 of the neck 22 is screwed into a reinforced opening 89 of the shell 87 so that the thermostat 25 extends horizontally into the oven box 86. A gas supply pipe 90 has a control valve 91, the end of the supply pipe 90 being threadedly received into the nipple 42. Between the valve 91 and the nipple 42 a pilot tube 95 is connected to the pipe 90, the pilot pipe 95 leading to a suitable position over the burner 88. A fuel pipe 96 connects to the nipple 47 and leads to the burner 88.

The operation of my invention is as follows:

When the thermostat 25 is at atmospheric temperature, the lever arm 55 is in the position shown in Fig. 4 so that the valve 10 is open. Therefore when the valve 91 is open, gas may flow from the pipe 90 through the valve 10 and the fuel pipe 96 into the burner 88. This condition exists when the oven 85 is first lighted, a match being applied to the burner 88 when the valve 91 is open. When the burner 88 has once been lighted, gas issuing from the pilot pipe 95 maintains a constant pilot flame until the valve 91 is again closed. The temperature of the oven 85, however, is maintained within a fixed temperature arranged by the operation of the valve 10, the gas supply valve 91 remaining open until it is desired that the oven no longer be heated.

When the burner 88 has been lighted as above described and the oven 85 becomes heated to the maximum of a desired range of temperature, the thermostat 25 operates to draw the rod 27 outward so as to release the pressure of the end 29 thereof against the lever 55. When the lever 55 is thus released, the spring 75 forces this lever from the position in which it is shown in Fig. 4 to the position in which it is shown in Fig. 3. The garter spring 70 is carried with the lever 55 to the opposite side of the ball 68 so as to quickly throw the ball 68 from the position in which it is shown in Fig. 4 to the position in which it is shown in Fig. 3. The ball 68 thus comes into contact with the seat 51 and closes the valve 10.

The supply of gas to the burner 88 through the supply pipe 96 is thus stopped and the burner 88 is extinguished. As before described, however the pilot light formed by issuing gas from the pilot pipe 95 continues burning. As the oven cools down from the maximum to the minimum of a desired range of temperature, the rod 27 is forced inward moving the lever 55 against the pressure of the spring 75 from its position shown in Fig. 3 to the position in which it is shown in Fig. 4. The ball 68 is thus removed from the seat 51 with a quick motion when a minimum temperature has been reached in the oven 85. The valve 10 being opened, gas is supplied to the burner 88, this gas being lighted by the pilot light as it issues from the burner, heating the oven 85 to maintain this above the minimum of the desired range of temperature.

The number of degrees of temperature between maximum and minimum is determined by the relative length of the arms of the lever 55, that is, the relation of the distance between the pin 29 and the pin 41 to the distance between the pin 29 and the ball 68. This relation may be made adjustable but, in the embodiment illustrated, it is a fixed relation. The temperature which is desired to be made the minimum temperature is determined by the positioning of the fulcrum of the lever 55 by the screwing in or out of the threaded shaft 36. For the purpose of indicating to the operator of the oven 85 just what the minimum temperature will be for a given setting of the shaft 36, indicia 97 are provided upon the hand wheel 37 which, when registering with a mark 98 on the valve shell 11, will indicate a given minimum temperature at which the oven will be maintained.

When the valve 91 is turned off so as to permit the oven 85 to cool to atmospheric temperature, the rod 27 of the thermostat 25 is projected inward a sufficient distance to exert a considerable pressure against the lever 55. If the lever 55 had a slide stop, this pressure would tend to either rupture the thermostat 25 or the lever 55. In the present invention, however, the foot 78 of the spring 75 comes into contact with the head 62 of the lever 55 when the lever is forced a given distance in the direction of the arrow 60 so as to cushion a further movement of the lever 55 in this direction.

As the valve 10 is opened and closed there would be a tendency, were it not for the upward pull of the spring 67 upon the garter spring 70, for the ball 68 to drop down, due to its weight, and fail to make a close contact with the valve seat 51. The spring 67 is designed to exercise just enough tension upon the garter spring 70 to offset this tendency of the ball 68 to drop out of alignment with the seat 51 so that when the valve closes a tight seal is formed between the ball 68 and the seat 51.

I claim as my invention:

1. In a quick-throw valve, the combination of: a valve member adapted to be quickly thrown on a non-vertical axis; means for limiting movement of said member on said axis; constriction means surrounding said member and urging said member along said axis; and means yieldably urging said constriction means in a direction transverse to said axis to lift said member.

2. In a quick-throw valve, the combination of: a valve member adapted to be quickly thrown on a substantially horizontal axis; means for limiting movement of said member on said axis; constriction means surrounding said member and urging said member along said axis; and means yieldably urging said constriction means in a direction transverse to said axis to lift said member.

3. In a quick-throw valve, the combination of: a valve member adapted to be quickly thrown on a non-vertical axis; means for limiting movement of said member on said axis; constriction means surrounding said member and urging said member along said axis; and a spring yieldably urging said constriction means in a direction transverse to said axis to lift said member.

4. In a quick-throw valve, the combination of: a spherical valve member adapted to be quickly thrown on a non-vertical axis; means for limiting movement of said member on said axis; constriction means surrounding said member and urging said member along said axis; and means yieldably urging said constriction means in a direction transverse to said axis to lift said member.

5. In a quick-throw valve, the combination of: a spherical valve member adapted to be quickly thrown on a substantially horizontal axis; means for limiting movement of said member on said axis; constriction means surrounding said member and urging said member along said axis; and means yieldably urging said constriction means in a direction transverse to said axis to lift said member.

6. In a quick-throw valve, the combination of: a valve member adapted to be quickly thrown on a non-vertical axis; means for limiting movement of said member on said axis; constriction means surrounding said member and urging said member along said axis; and means yieldably urging said constriction means in a direction transverse to said axis to lift said member.

7. In a quick-throw valve, the combination of: a valve member adapted to be quickly thrown on a substantially horizontal axis; means for limiting movement of said member on said axis; constriction means surrounding said member and urging said member along said axis; and means yieldably urging said constriction means in a direction transverse to said axis to lift said member.

8. In a quick-throw valve, the combination of: a spherical valve member adapted to be quickly thrown on a non-vertical axis; means for limiting movement of said member on said axis; constriction means surrounding said member and urging said member along said axis; and means yieldably urging said constriction means in a direction transverse to said axis to lift said member.

9. In a quick-throw valve, the combination of: a valve member adapted to be quickly thrown on a non-vertical axis; means for limiting movement of said member on said axis; constriction means surrounding said member; an actuating element having a recess, opposite walls of which engage said constriction means for moving said constriction means along said axis, an opening being provided in said actuating element in which said member may move, a cavity being formed in said element connecting with said recess; and a spring disposed in said cavity and urging said constriction means in a direction transverse to said axis to lift said member.

10. In a quick-throw valve, the combination of: a spherical valve member adapted to be quickly thrown on a non-vertical axis; means for limiting movement of said member on said axis; constriction means surrounding said member; an actuating element having a recess, opposite walls of which engage said constriction means for moving said constriction means along said axis, an opening being provided in said actuating element in which said member may move, a cavity being formed in said element connecting with said recess; and a spring disposed in said cavity and urging said constriction means in a direction transverse to said axis to lift said member.

11. In a quick-throw valve, the combination of: a body; a lever fulcrumed on said body; a valve mechanism operated in a given path by swinging said lever about said fulcrum; and a leaf spring carried by said lever and engaging said body and causing said lever to constrain said valve in said path.

12. In a quick-throw valve, the combination of: a body; a lever fulcrumed on said body; a valve mechanism operated in a given path by swinging said lever about said fulcrum; and a leaf spring carried by said lever and slidably engaging said body and causing said lever to constrain said valve in said path.

13. In a quick-throw valve, the combination of: a body; a lever fulcrumed on said body; a valve mechanism operated in a given path by swinging said lever about said fulcrum; and a leaf spring carried by said lever and engaging said body and causing said lever to constrain said valve in said path and to urge said lever so as to operate said valve.

14. In a quick-throw valve, the combination of: a body; a lever fulcrumed on said body; a valve mechanism operated in a given path by swinging said lever about said fulcrum; a leaf spring carried by said lever and engaging said body and causing said lever to constrain said valve in said path and to urge said lever so as to operate said valve in one direction; means for urging said lever in a direction opposite that of said spring; and a foot formed on said spring for contacting said lever at a given point in said lever's movement and yieldably resists forcing of said lever by said means beyond said point.

15. In a quick-throw valve, the combination of: a body having a chamber; a pipe extending into said chamber, a valve seat being formed in said pipe; a ball adapted to contact said valve seat and move away from said seat a given distance on a given path; constriction means disposed about said ball; a lever fulcrumed on said body and bifurcated at one end to receive said constriction means, and apertured to receive said ball through said constriction means and extend over said pipe; means for actuating said valve by urging said lever toward said pipe; and a leaf spring carried by said lever and contacting said body so as to urge said lever away from said pipe, said spring having a bifurcated end which straddles said pipe so that said lever guides said ball in its path.

16. In a quick-throw valve, the combination of: a body having a chamber; a pipe extending into said chamber, a valve seat being formed in said pipe; a ball adapted to contact said valve seat and move away from said seat a given distance on a given path; constriction means disposed about said ball; a lever fulcrumed on said body and bifurcated at one end to receive said constriction means, and apertured to receive said ball through said constriction means and extend over said pipe; means for actuating said valve by urging said lever toward said pipe; and a leaf spring carried by said lever and contacting said body so as to urge said lever away from said pipe, said spring having a bifurcated end which straddles said pipe so that said lever guides said ball in its path, said bifurcated end of said leaf spring being formed to yieldably contact said lever at a given point in its movement toward said pipe.

17. In a quick-throw valve, the combination of: a valve member adapted to be quickly thrown on a non-vertical axis; means for limiting movement of said member on said axis; constriction means surrounding said member and urging said member along said axis; and means for supporting said constriction means so as to lift said member.

In testimony whereof, I have hereunto set my hand at Los Angeles, California, this 22nd day of April, 1927.

WILLIAM B. BASTIAN.